United States Patent
Obuchi et al.

(10) Patent No.: US 9,565,597 B2
(45) Date of Patent: Feb. 7, 2017

(54) RADIO COMMUNICATION METHOD, RELAY STATION AND MOBILE STATION

(71) Applicant: FUJITSU LIMITED, Kawasaki-shi, Kanagawa (JP)

(72) Inventors: Kazuhisa Obuchi, Yokohama (JP); Yoshihiro Kawasaki, Kawasaki (JP); Yoshiaki Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 715 days.

(21) Appl. No.: 13/860,013

(22) Filed: Apr. 10, 2013

(65) Prior Publication Data

US 2013/0223328 A1 Aug. 29, 2013

Related U.S. Application Data

(63) Continuation of application No. PCT/JP2010/069581, filed on Nov. 4, 2010.

(51) Int. Cl.
*H04B 7/155* (2006.01)
*H04W 36/00* (2009.01)
*H04W 84/04* (2009.01)

(52) U.S. Cl.
CPC ..... *H04W 36/0005* (2013.01); *H04B 7/15528* (2013.01); *H04W 36/0072* (2013.01); *H04W 84/047* (2013.01)

(58) Field of Classification Search
CPC .............. H04W 36/0005; H04W 36/0072; H04W 84/047; H04B 7/15528
See application file for complete search history.

(56) References Cited

U.S. PATENT DOCUMENTS

| 2007/0293224 A1 | 12/2007 | Wang et al. |
| 2008/0232296 A1* | 9/2008 | Shin ............ H04B 7/2606 370/315 |
| 2011/0034177 A1* | 2/2011 | Oh ............. H04J 11/0086 455/450 |

(Continued)

FOREIGN PATENT DOCUMENTS

| AU | 2007261342 | 12/2007 |
| AU | 2010200888 | 4/2010 |

(Continued)

OTHER PUBLICATIONS

3rd Generation Partnership Project; Technical Specification Group Radio Access Network; Evolved Universal Terrestrial Radio Access (E-UTRA); "Physical Channels and Modulation (Release 9)", Mar. 2010, 3GPP TS 36.211 V9.1.0.

(Continued)

*Primary Examiner* — Andrew Lai
*Assistant Examiner* — Chuong M Nguyen
(74) *Attorney, Agent, or Firm* — Myers Wolin, LLC

(57) ABSTRACT

In a mobile communication system, a mobile station receives intermittently a channel transmitted by a first or second base station through a relay station. Herein, the relay station, before execution of a handover for switching a connection destination of its own station from the first base station to the second base station, transmits information on the second base station. The mobile station, based on the information on the second base station received from the relay station before the handover, controls a timing for receiving the channel from the relay station after the handover.

7 Claims, 16 Drawing Sheets

(56) References Cited

U.S. PATENT DOCUMENTS

| | | | |
|---|---|---|---|
| 2011/0171926 A1* | 7/2011 | Faccin | H04W 48/18 455/404.1 |
| 2011/0211521 A1 | 9/2011 | Baba et al. | |
| 2011/0222428 A1* | 9/2011 | Charbit | H04B 7/15557 370/252 |

FOREIGN PATENT DOCUMENTS

| | | | | |
|---|---|---|---|---|
| CA | 2655954 | | 12/2007 | |
| EP | 2039211 | | 3/2009 | |
| JP | 9-121188 | | 5/1997 | |
| JP | 2001-061174 | | 3/2001 | |
| JP | 2001061174 A | * | 3/2001 | ............... H04Q 7/22 |
| JP | 2001-128208 | | 5/2001 | |
| JP | 2009-542100 | | 11/2009 | |
| JP | 2010-056934 | | 3/2010 | |
| JP | 2010-147976 | | 7/2010 | |
| JP | 2010-161792 | | 7/2010 | |
| JP | 2010147976 A | * | 7/2010 | ............ H04W 52/02 |
| WO | WO 2007078138 A2 | * | 7/2007 | |
| WO | 2007/149509 | | 12/2007 | |
| WO | WO 2007149509 A2 | * | 12/2007 | ........ H04W 36/0055 |
| WO | WO 2008060021 A1 | * | 5/2008 | ............ H04W 36/00 |

OTHER PUBLICATIONS

3rd Generation Partnership Project; Technical Specification Group Radio Access Network; Evolved Universal Terrestrial Radio Access (E-UTRA); "Physical layer procedures (Release 9)", Mar. 2010, 3GPP TS 36.213 V9.1.0.

3rd Generation Partnership Project; Technical Specification Group Radio Access Network; Evolved Universal Terrestrial Radio Access (E-UTRA); Radio Resource Control (RRC); "Protocol specification (Release 9)", Mar. 2010, 3GPP TS 36.331 V9.2.0.

3rd Generation Partnership Project; Technical Specification Group Radio Access Network; "Feasibility study for Further Advancements for E-UTRA (LTE-Advanced) (Release 9)", Sep. 2009, 3GPP TR 36.912 V9.0.0.

International Search Report issued for corresponding International Patent Application No. PCT/JP2010/069581, mailed Dec. 14, 2010 with English translation.

* cited by examiner

| TIMING DIFFERENCE INFORMATION | BROADCAST INFORMATION (BASE STATION100) | BROADCAST INFORMATION (BASE STATION100a) |
|---|---|---|

(B)

| TIMING DIFFERENCE INFORMATION | BROADCAST INFORMATION (BASE STATION100) | BROADCAST INFORMATION (DIFFERENCE) |
|---|---|---|

RADIO COMMUNICATION METHOD, RELAY STATION AND MOBILE STATION

CROSS-REFERENCE TO RELATED APPLICATION

This application is a continuation application of International Application PCT/JP2010/069581 filed on Nov. 4, 2010 which designated the U.S., the entire contents of which are wholly incorporated herein by reference.

FIELD

The embodiments discussed herein are related to a radio communication method, a relay station and a mobile station.

BACKGROUND

Currently, a mobile communication system such as a mobile phone system is used widely. In addition, in order to achieve further speed improvement and capacity enlargement of radio communication, active discussion is carried out continuously with respect to a next-generation mobile communication technology. For example, in international standardization organization 3GPP (3rd Generation Partnership Project), a standard referred to as LTE (Long Term Evolution) is proposed (See, for example, 3rd Generation Partnership Project, "Evolved Universal Terrestrial Radio Access (E-UTRA); Physical Channels and Modulation", 3GPP TS 36.211 V9.1.0, 2010-03, 3rd Generation Partnership Project, "Evolved Universal Terrestrial Radio Access (E-UTRA); Physical layer procedures", 3GPP TS 36.213 V9.1.0, 2010-03. and 3rd Generation Partnership Project, "Evolved Universal Terrestrial Radio Access (E-UTRA); Radio Resource Control (RRC); Protocol specification", 3GPP TS 36.331 V9.2.0, 2010-03). In addition, a standard referred to as LTE-A (Long Term Evolution-Advanced) with LTE extended is also proposed (See, for example, 3rd Generation Partnership Project, "Feasibility study for Further Advancements for E-UTRA", 3GPP TR 36.912 V9.0.0, 2009-09).

In a mobile communication system, a relay station which relays communication between a base station and a mobile station may be provided. By providing a relay station, expansion of a cell coverage and enhancing of a throughput or the like may be achieved. However, in the relay station, interference (self-interference) may arise between a reception signal and a transmission signal of its own station. For example, when a frequency band used between the base station and the relay station and a frequency band used between the relay station and the mobile station are overlapped, there is a possibility that a radio signal transmitted to the mobile station sneaks into a reception circuit of its own station, and the radio signal may not be received normally from the base station. Then, it is proposed that the relay station adjusts a timing for performing communication with the base station and a timing for performing communication with the mobile station, and suppresses the self-interference (See, for example, Section 9 of 3rd Generation Partnership Project, "Feasibility study for Further Advancements for E-UTRA", 3GPP TR 36.912 V9.0.0, 2009-09).

In addition, in a mobile communication system, when a mobile station is in a standby state, there is a method for achieving power-saving of a mobile station by limiting the timing for receiving a radio signal from a base station. For example, the mobile station receives periodically a paging channel which the base station transmits at a timing agreed between the base station and the mobile station in advance, and at the other timings, stops the reception processing. The base station, when performing calling with respect to the mobile station, transmits paging information indicating a mobile station of calling destination by the paging channel. The mobile station, when receiving the paging channel and detecting a call for its own station, resumes data communication (See, for example, Section 5.3.2 of 3rd Generation Partnership Project, "Evolved Universal Terrestrial Radio Access (E-UTRA); Radio Resource Control (RRC); Protocol specification", 3GPP TS 36.331 V9.2.0, 2010-03).

Meanwhile, in a mobile communication system where a base station and a mobile station perform communication through a relay station, a case where the relay station performs a handover for switching a base station of connection destination may be considered. For example, when the relay station is mounted on a vehicle such as a train or a car, and the mobile station is carried by a passenger of the vehicle and performs communication through the relay station, a situation where although a handover for switching a connection destination of the mobile station does not arise, a handover for switching a connection destination of the relay station arises may be considered.

However, in that case, an influence which the handover of the relay station exerts on the mobile station which is in a state of performing a reception processing intermittently becomes a problem. For example, a transmission timing of a paging channel to be received by the mobile station may be different depending on the base station. Consequently, when the relay station performs the handover, the timing for transferring the paging channel to the mobile station may also be changed. The mobile station which is in an intermittent receiving state, after the occurrence of handover in the relay station, even when trying to receive the paging channel at the same timing as that before the handover, may fail in the reception. It may be considered that the mobile station which has failed in reception of the paging channel, determining that the mobile station has moved outside a serving area of the relay station, repeats processing of cell searching or the like, for example. Consequently, there is a problem that time is needed until the mobile station returns to the state of receiving the paging channel intermittently, and an electric power consumption increases.

SUMMARY

According to an aspect of the embodiments to be discussed herein, there is provided a radio communication method of a mobile communication system where a mobile station receives intermittently a channel transmitted by a first or second base station through a relay station. This method includes: transmitting, by the relay station, information on the second base station before execution of a handover for switching a connection destination of the relay station from the first base station to the second base station, and controlling, by the mobile station, based on the information on the second base station received from the relay station before the handover, a timing for receiving the channel from the relay station after the handover.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 illustrates an example of handover information;

DESCRIPTION OF EMBODIMENTS

Figure 1:
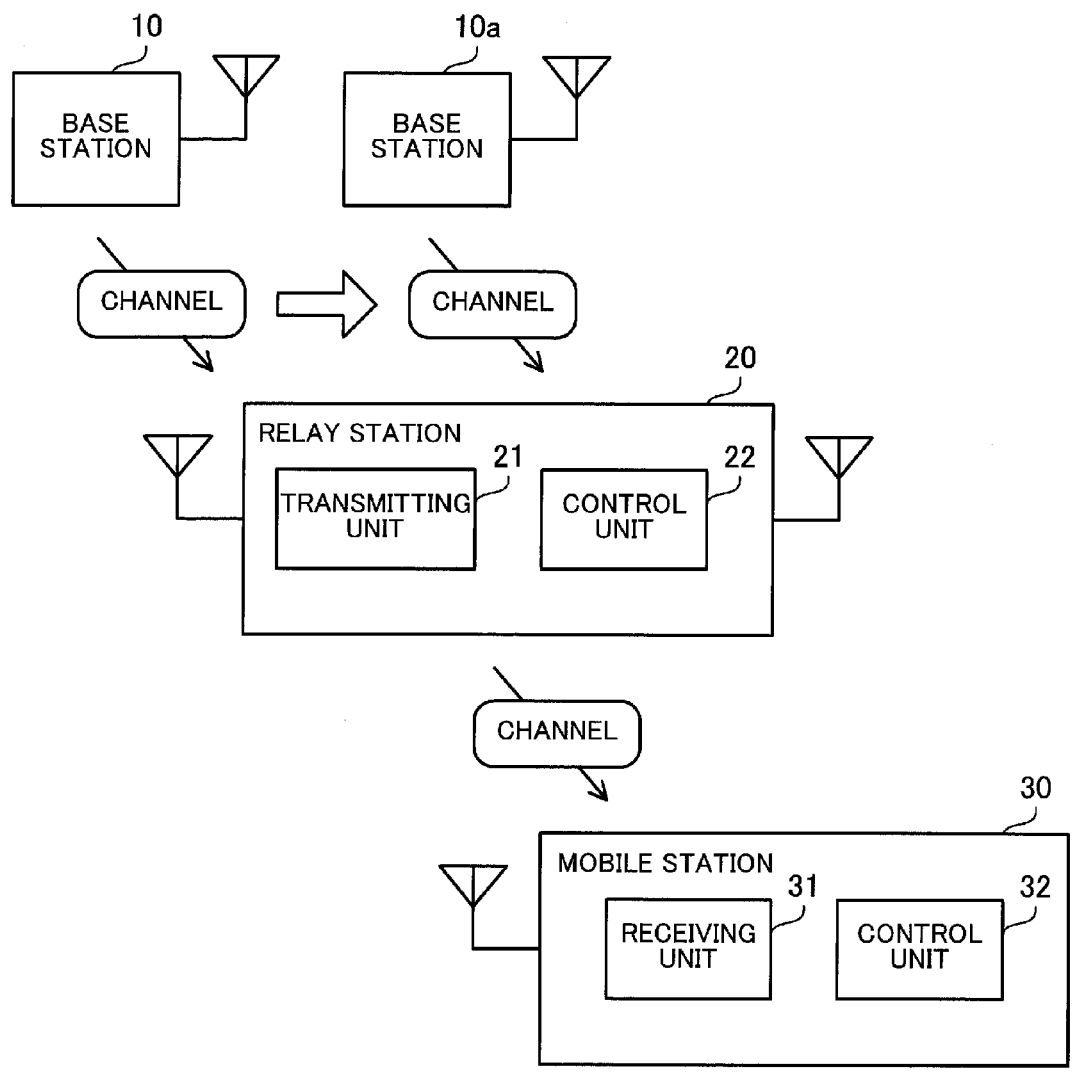
FIG. 1 illustrates a mobile communication system of a first embodiment.

Several embodiments will be described below with reference to the accompanying drawings, wherein like reference numerals refer to like elements throughout.

First Embodiment

FIG. 1 illustrates a mobile communication system of a first embodiment. The mobile communication system of the first embodiment includes base stations 10 and 10a, a relay station 20, and a mobile station 30. The mobile station 30 is connected to the relay station 20. The relay station 20, while being connected to the base station 10 or the base station 10a, relays communication of the mobile station 30. The relay station 20 is a mobile radio device, for example.

The relay station 20 includes a transmitting unit 21 and a control unit 22. The transmitting unit 21 transfers a channel transmitted by the base station 10 at the timing appropriate to the base station 10. In addition, when handover for switching a connection destination of the relay station 20 from the base station 10 to the base station 10a is executed, transfers a channel transmitted by the base station 10a at the timing appropriate to the base station 10a. The above-mentioned channel is a paging channel used for calling of the mobile station 30, for example. The control unit 22, before the handover, carries out control so as to transmit information on the base station 10a. The information on the base station 10a is included in broadcast information of the base station 10a, for example.

The mobile station 30 includes a receiving unit 31 and a control unit 32. The receiving unit 31, through the relay station 20, receives a channel transmitted by the base station 10 or the base station 10a (for example, a paging channel) intermittently (for example, periodically). The control unit 32, before execution of the above-mentioned handover, acquires information on the base station 10a from the relay station 20. In the information on the base station 10a, information used for specifying a frame that receives the channel is included, for example. The control unit 32, based on the acquired information on the base station 10a, controls the timing for receiving the channel from the relay station 20 after the handover.

Besides, the relay station 20 may transmit (broadcast) the information on the base station 10a by a broadcast channel in a period after the determination of handover until the execution of handover. In that case, the relay station 20 may transmit, by the above-mentioned channel, notification information indicating that information transmitted by the broadcast channel has changed. The mobile station 30 which receives the above-mentioned channel intermittently, when detecting the notification information, receives the broadcast channel to extract the information on the base station 10a. In addition, the relay station 20, before the handover, may multiplex the information on the base station 10a with the broadcast information of the base station 10, and transmit the multiplexed information by the broadcast channel. The relay station 20 may receive wirelessly from the base station 10a, or may acquire through the base station 10, the information on the base station 10a.

In the mobile communication system of the first embodiment as mentioned above, the relay station 20, before execution of the handover for switching a connection destination of its own station from the base station 10 to the base station 10a, transmits the information on the base station 10a. The mobile station 30, based on the information on the base station 10a received from the relay station 20 before the handover, controls the timing for receiving a channel from the relay station 20 after the handover.

This makes it possible to suppress an influence on the mobile station 30 receiving the channel intermittently, even when the relay station 20 performs handover. That is, the mobile station 30 is able to acquire the information on the base station 10a from the relay station 20 before the handover, and therefore, even if the timing at which the relay station 20 transfers the above-mentioned channel changes due to the handover, the mobile station 30 is able to calculate the timing after the change easily. Therefore, the mobile station 30 is able to move promptly to a state of intermittently receiving the channel transmitted by the base station 10a, and an electric power consumption of the mobile station 30 is able to be suppressed.

Second Embodiment

Figure 2:
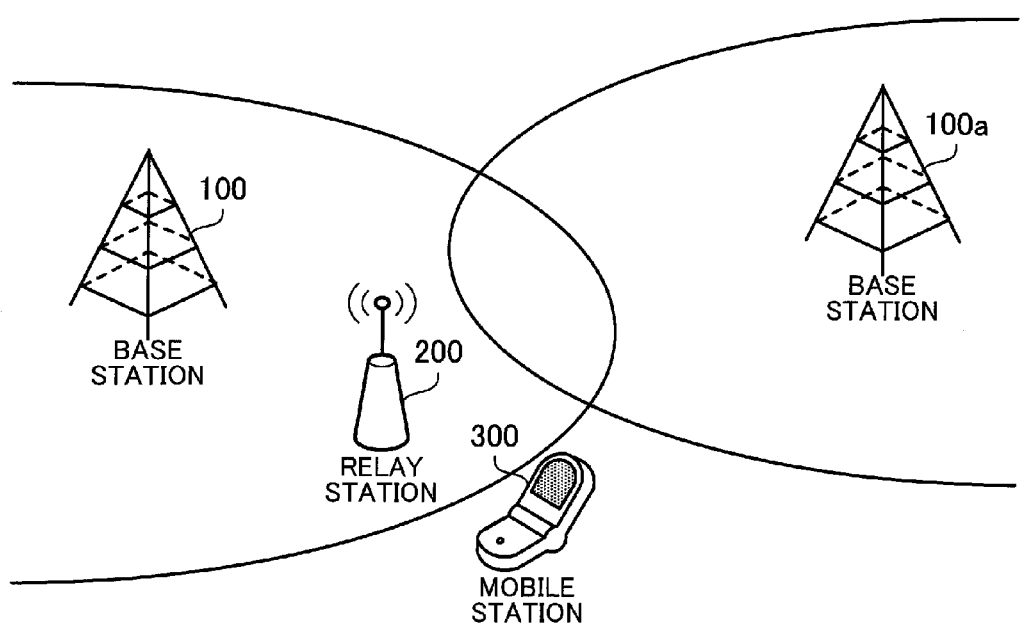
FIG. 2 illustrates a mobile communication system of a second embodiment.

FIG. 2 illustrates a mobile communication system of a second embodiment. The mobile communication system of the second embodiment includes base stations 100 and 100a, a relay station 200, and a mobile station 300. The mobile station 300 performs communication with the base stations 100 and 100a through the relay station 200.

The base stations 100 and 100a are radio communication apparatuses which perform radio communication with the relay station 200. The base stations 100 and 100a are connected to a wired network (not illustrated). The base stations 100 and 100a, between the wired network and the relay station 200, transfer data which the mobile station 300 transmits or receives. In addition, the base stations 100 and 100a, when performing calling of the mobile station 300, transmits calling information by a paging channel (PCH: Paging Channel). Besides, in the second embodiment, a case where the base station 100 and the base station 100a transmit a frame and symbol at a different timing will be considered.

The relay station 200 is a radio communication apparatus which is connected to the base station 100 or the base station 100a, and relays communication between a base station of connection destination and the mobile station 300. The relay station 200 is synchronized with the base station of connection destination, and transmits a frame and symbol to the mobile station 300 at the timing in accordance with a synchronization state of the base station side. The relay station 200, between the base station of connection destination and the mobile station 300, transfers data and PCH. Besides, in the second embodiment, a case where the relay station 200 is a mobile relay station (for example, a relay station mounted on a vehicle such as a train or a car), and performs a handover for switching a connection destination from the base station 100 to the base station 100a will be considered.

The mobile station 300 is a radio terminal device which is connected to the relay station 200, and performs communication with the base stations 100 and 100a through the relay station 200. As the mobile station 300, a mobile phone and a mobile information terminal device may be used, for example. The mobile station 300 is synchronized with the relay station 200, and performs data transmission to the relay station 200, and data reception from the relay station 200. In addition, in a standby state where data communication is not performed, the mobile station 300 receives PCH periodically from the relay station 200. Then, the mobile station 300, upon receiving calling information indicating calling of its own station, releases the standby state.

Besides, a frame where PCH is to be received by the mobile station 300 is calculated based on parameters included in broadcast information which the base stations 100 and 100a transmit and identification information given to the mobile station 300. The parameters used for the calculation of the frame where PCH is received may differ depending on a base station which transmits PCH. That is, depending on whether the relay station 200 is connected to the base station 100, or connected to the base station 100a, the frame where the mobile station 300 receives PCH from the relay station 200 may differ.

In addition, the relay station 200 may be implemented as a relay station referred to as Type1 in LTE-A. That is, the relay station 200 operates as a radio communication apparatus which performs protocol processing up to a layer 3, and is capable of accessing the mobile station 300 like the base stations 100 and 100a. A frequency band used for radio communication between the base station and the relay station, and a frequency band used for radio communication between the relay station and the mobile station are overlapped at least partially.

Figure 3:
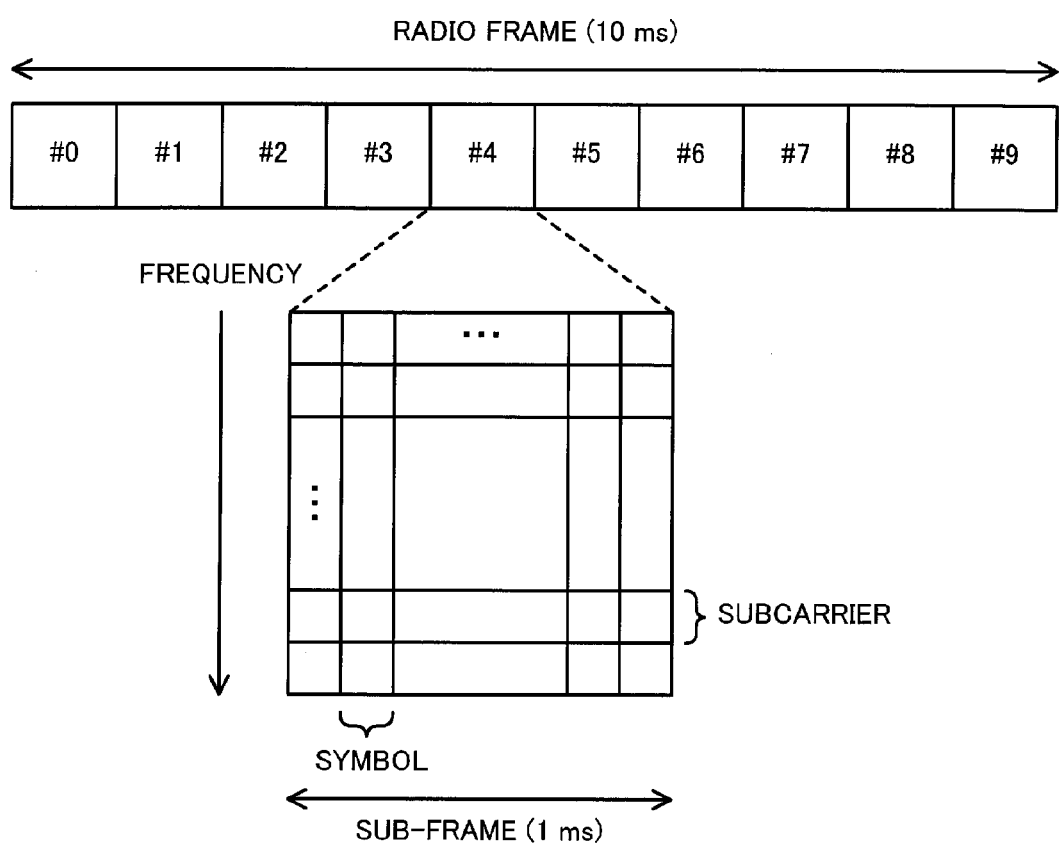
FIG. 3 illustrates a structural example of a radio frame.

FIG. 3 illustrates a structural example of a radio frame. The radio frame as illustrated in FIG. 3 is transmitted in each of a communication link (downlink (DL: Downlink)) in the direction from the base stations 100 and 100a to the mobile station 300 and a communication link (uplink (UL: Uplink)) in the direction from the mobile station 300 to the base stations 100 and 100a. In the second embodiment, considered is a case where a frequency division duplex (FDD) is used as a duplex operation system. However, it is also possible to use a time division duplex (TDD).

The radio frame having a width of 10 ms includes 10 sub-frames (sub-frames #0 to #9) each having a width of 1 ms. A radio resource of the sub-frame is subdivided in a frequency direction and a time direction to be managed. The smallest unit in the frequency direction is a subcarrier and the smallest unit in the time direction is a symbol. Subdivided radio resources are assigned to various channels. Transmission scheduling of data and control information is performed in a unit of a sub-frame.

In a downlink radio frame, as a physical channel, a physical downlink shared channel (PDSCH), a physical downlink control channel (PDCCH), a physical broadcast channel (PBCH) and the like are transmitted. PDSCH is a channel for transmitting data. PDCCH is a channel for transmitting a control signal of a physical layer. In PDCCH, several leading symbols (1 to 3 symbols) of the sub-frame are assigned. PBCH is a channel for transmitting broadcast information such as system information.

In addition, in the downlink radio frame, PCH that is a transport channel is mapped on PDSCH to be transmitted. In addition, in the radio frame, a pilot signal such as a reference signal (RS) is transmitted. The pilot signal is referred to for measurement of a reception power level and a radio channel quality, and synchronization establishment or the like.

Figure 4:
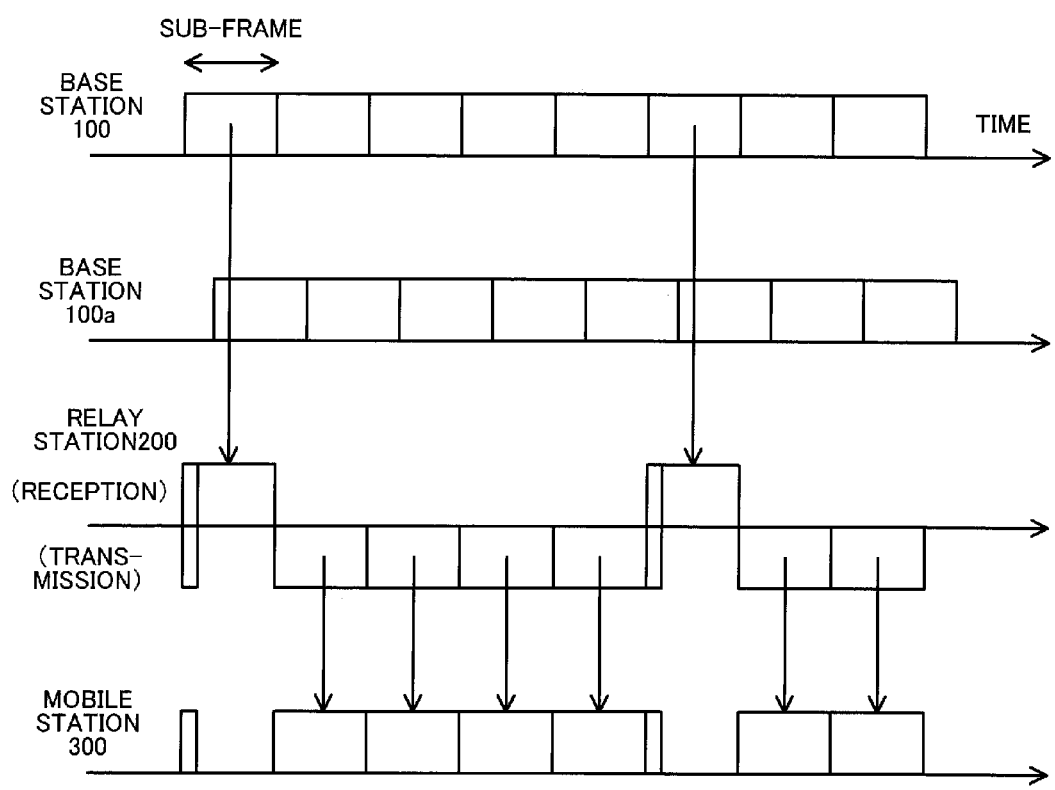
FIG. 4 illustrates an example of a communication timing of a relay station.

FIG. 4 illustrates an example of a communication timing of the relay station. The relay station 200, in order to suppress a self-interference, carries out control so as not to perform concurrently reception of a radio signal from the base stations 100 and 100a and transmission of a radio signal to the mobile station 300.

That is, the relay station 200 configures a sub-frame that receives a radio signal from the base stations 100 and 100a. Then, in this configured sub-frame, the transmission of the radio signal to the mobile station 300 is stopped, and in a sub-frame other than this configured sub-frame, the radio signal is transmitted to the mobile station 300. However, the relay station 200, even in the sub-frame that receives the radio signal from the base stations 100 and 100a, in a control resource area assigned to PDCCH, may transmit the radio signal to the mobile station 300.

Besides, the relay station 200 agrees with the base stations 100 and 100a in advance on the sub-frame that receives the radio signal from the base stations 100 and 100a. In addition, the relay station 200, also in uplink communication in the same way as in downlink communication, carries out control so as not to perform concurrently reception of the radio signal from the mobile station 300 and transmission of the radio signal to the base stations 100 and 100a.

Figure 5:
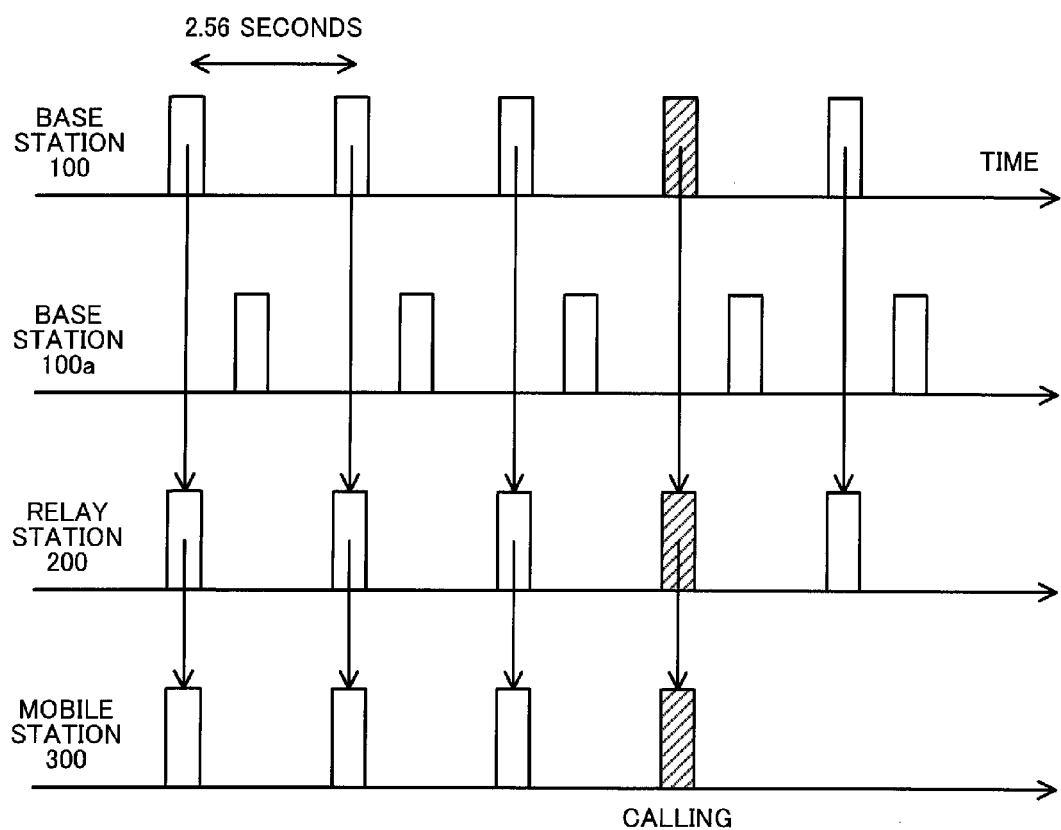
FIG. 5 illustrates a transmission example of a paging channel.

FIG. 5 illustrates a transmission example of a paging channel. In FIG. 5, a case where the relay station 200 is connected to the base station 100 will be considered. The base stations 100 and 100a transmit PCH continuously. The relay station 200 receives PCH from the base station 100, and transfers PCH by the downlink sub-frame. The mobile station 300, in a standby state, receives a part of PCH transmitted by the base station 100 from the relay station 200 periodically (every 2.56 seconds, for example).

The period and sub-frame where the mobile station 300 receives PCH, as mentioned previously, are calculated from parameters included in the broadcast information transmitted by the base station 100 and the identification information given to the mobile station 300. The mobile station 300 receives only a part of PCH transmitted by the base station 100, and thereby, power-saving of the mobile station 300 may be achieved. The relay station 200 receives broadcast information of the base station 100 from the base station 100 and transmits it by PBCH of the downlink radio frame.

In PCH, as mentioned above, the calling information indicating calling of the mobile station 300 is transmitted. The mobile station 300, when receiving PCH to detect calling of its own station, releases the standby state to enter a state where data communication is possible. On the other hand, the mobile station 300, when not detecting calling of its own station, stops an operation of a reception circuit thereof until the timing for receiving PCH next (for example, after 2.56 seconds). However, in PCH, notification information indicating that the broadcast information has been updated may be transmitted. The mobile station 300, when detecting the update of the broadcast information, before stopping the operation of the reception circuit, receives PBCH from the relay station 200. Then, the mobile station 300, in the case where parameters included in the broadcast information change, re-calculates a period and sub-frame where PCH is received.

Figure 6:
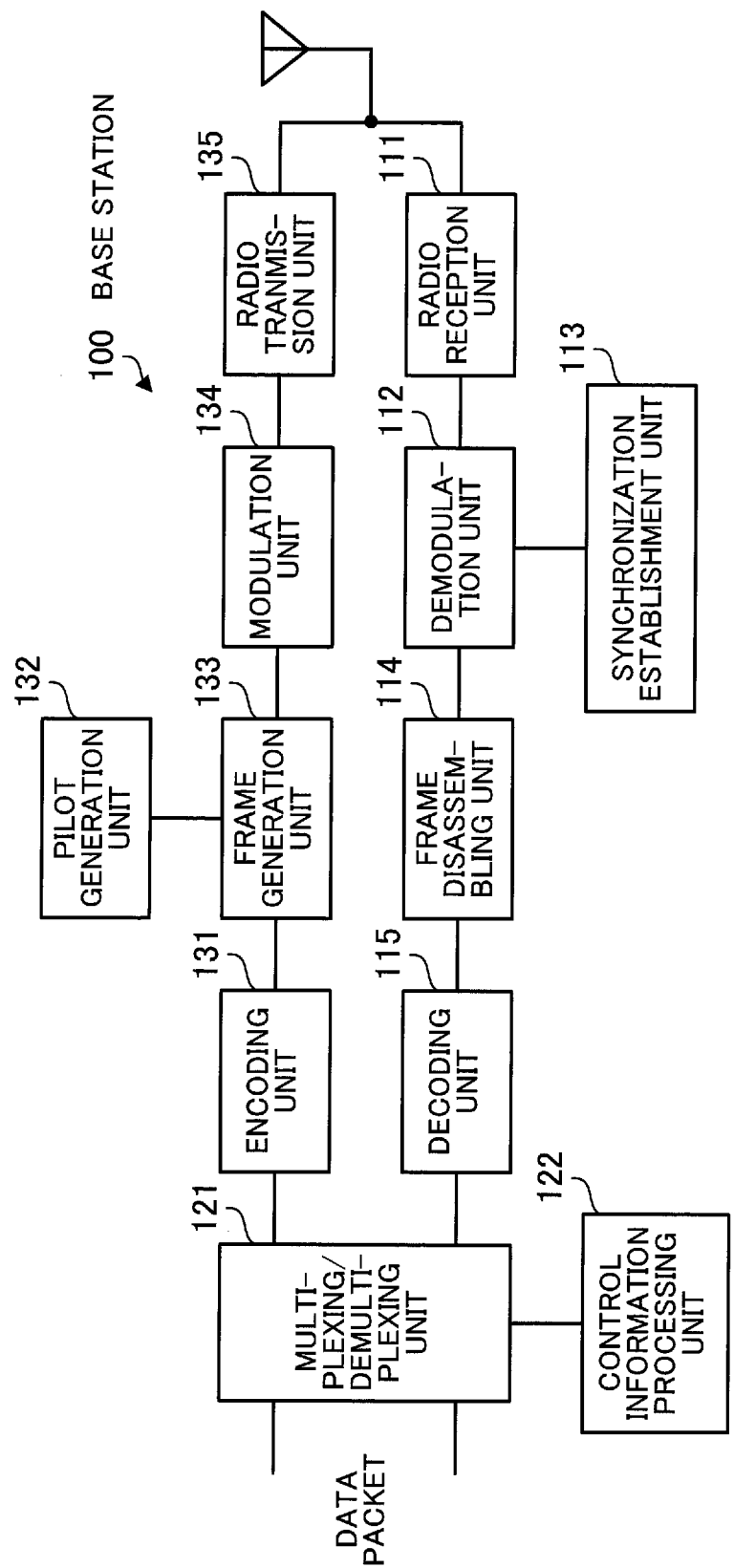
FIG. 6 is a block diagram illustrating a base station.

FIG. 6 is a block diagram illustrating the base station. The base station 100 includes a radio reception unit 111, a demodulation unit 112, a synchronization establishment unit 113, a frame disassembling unit 114, a decoding unit 115, a multiplexing/demultiplexing unit 121, a control information processing unit 122, an encoding unit 131, a pilot generation unit 132, a frame generation unit 133, a modulation unit 134, and a radio transmission unit 135. The base station 100a is also able to be realized using the same block configuration as the base station 100.

The radio reception unit 111 carries out radio signal processing of a reception signal acquired from an antenna which the base station 100 includes, and performs conversion (down-conversion) from a high frequency radio signal to a low frequency baseband signal. The radio reception unit 111, for example, includes circuits such as a low noise amplifier (LNA), an orthogonal demodulator, and an ADC (Analog to Digital Converter). The radio reception unit 111 outputs the acquired baseband signal to the demodulation unit 112.

The demodulation unit 112 carries out digital demodulation of the baseband signal acquired from the radio reception unit 111. The demodulation is performed by a method compatible with a prescribed modulation and coding scheme (MCS) or the adaptively selected MCS.

Then, the demodulation unit 112 outputs the demodulated baseband signal to the frame disassembling unit 114. In addition, the demodulation unit 112 extracts a pilot signal from the demodulated baseband signal, and outputs it to the synchronization establishment unit 113.

The synchronization establishment unit 113, based on the known pilot signal acquired from the demodulation unit 112, detects the timing for receiving an uplink radio frame and symbol from the relay station 200, and establishes synchronization with the relay station 200. Then, the synchronization establishment unit 113 controls the timing of reception processing of the base station 100.

The frame disassembling unit 114, from the baseband signal acquired from the demodulation unit 112, demultiplexes and extracts baseband signals of various channels included in the uplink radio frame. Then, the frame disassembling unit 114 outputs the extracted baseband signal for every channel to the decoding unit 115.

The decoding unit 115 carries out error correction decoding of baseband signals of various channels acquired from the frame disassembling unit 114. The decoding is performed by a method compatible with the prescribed MCS or the adaptively selected MCS. Then, the decoded baseband signal is output to the multiplexing/demultiplexing unit 121.

The multiplexing/demultiplexing unit 121 demultiplexes data and control information which are included in the baseband signal acquired from the decoding unit 115. The demultiplexed data is packetized, and is output to the wired network. The demultiplexed control information is output to the control information processing unit 122. In addition, the multiplexing/demultiplexing unit 121 multiplexes data to be transmitted to the mobile station 300 with the control information acquired from the control information processing unit 122, and outputs the multiplexed signal to the encoding unit 131.

The control information processing unit 122 acquires uplink control information from the multiplexing/demultiplexing unit 121, and controls communication with the relay station 200. In the uplink control information, a handover request is included. The control information processing unit 122, when acquiring the handover request transmitted by the relay station 200, performs handover control for switching a connection destination of the relay station 200 from the base station 100 to the base station 100a. In addition, the control information processing unit 122 generates downlink control information, and outputs it to the multiplexing/demultiplexing unit 121. In the downlink control information, a handover instruction for instructing the relay station 200 to execute the handover is included. In addition, in the downlink control information, broadcast information and calling information of PCH are included.

The encoding unit 131 carries out error correction encoding of the baseband signals of various channels acquired from the multiplexing/demultiplexing unit 121. The encoding is performed using the prescribed MCS or the adaptively selected MCS. Then, the encoded baseband signal is output to the frame generation unit 133.

The pilot generation unit 132 generates a known pilot signal such as RS, and outputs the generated pilot signal to the frame generation unit 133.

The frame generation unit 133 maps the baseband signal acquired from the encoding unit 131 and the pilot signal acquired from the pilot generation unit 132 on the downlink radio frame. Then, the frame generation unit 133 outputs the baseband signal of the downlink radio frame to the modulation unit 134.

The modulation unit 134 carries out digital modulation of the baseband signal acquired from the frame generation unit 133. The modulation is performed using the prescribed MCS or the adaptively selected MCS. Then, the modulation unit 134 outputs the modulated baseband signal to the radio transmission unit 135.

The radio transmission unit 135 carries out radio signal processing of the baseband signal acquired from the modulation unit 134, and carries out conversion (up-conversion) from a low frequency baseband signal to a high frequency radio signal. The radio transmission unit 135, for example, includes circuits such as a DAC (Digital to Analog Converter), an orthogonal modulator, and a power amplifier. The radio transmission unit 135 outputs the acquired transmission signal to the antenna which the base station 100 includes.

Figure 7:
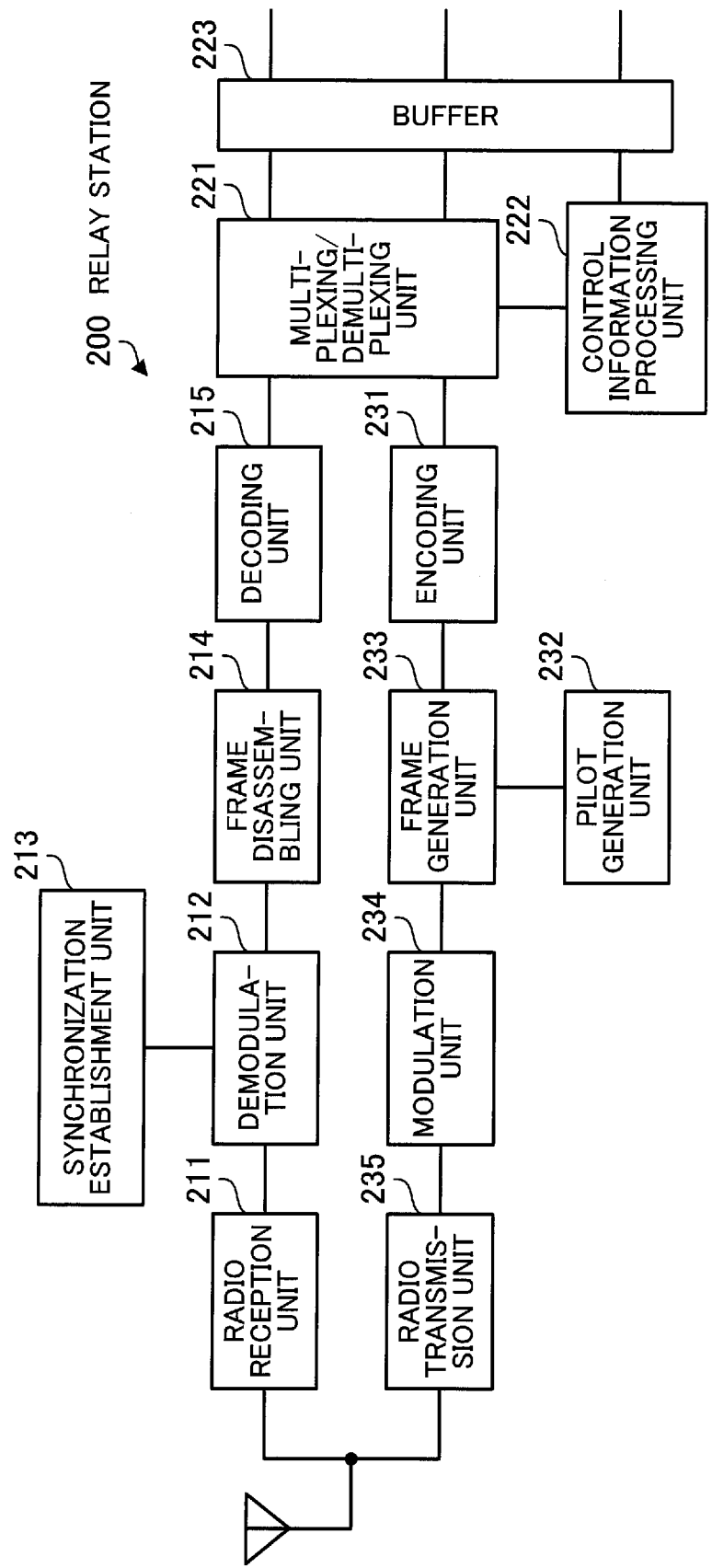
FIG. 7 is a block diagram illustrating the relay station.

FIG. 7 is a block diagram illustrating the relay station. FIG. 7 illustrates a block structure on the base stations 100 and 100a side. The relay station 200 includes a radio reception unit 211, a demodulation unit 212, a synchronization establishment unit 213, a frame disassembling unit 214, a decoding unit 215, a multiplexing/demultiplexing unit 221, a control information processing unit 222, a buffer 223, an encoding unit 231, a pilot generation unit 232, a frame generation unit 233, a modulation unit 234, and a radio transmission unit 235.

The radio reception unit 211 down-converts the high frequency radio signal acquired from an antenna which the relay station 200 includes to a low frequency baseband signal, and outputs the resultant signal to the demodulation unit 212.

The demodulation unit 212 carries out digital demodulation of the baseband signal acquired from the radio reception unit 211, and outputs the demodulated signal to the frame disassembling unit 214. In addition, the demodulation unit 212 extracts a pilot signal from the demodulated baseband signal, and outputs it to the synchronization establishment unit 213.

The synchronization establishment unit 213, based on the pilot signal acquired from the demodulation unit 212, detects the timing for receiving the downlink radio frame and symbol from the base stations 100 and 100a, and establishes synchronization with the base station 100 or base station 100a. Then, the synchronization establishment unit 213 controls the timing of the reception processing of the relay station 200. In addition, the synchronization establishment unit 213 performs cell searching. That is, the synchronization establishment unit 213 measures a reception power level of each cell based on the pilot signal, and detects a candidate of the base station to be a connection destination. Besides, when the relay station 200 performs the handover, the reception timing from a base station of a handover destination is already detected by the cell searching before execution of the handover. Therefore, the synchronization establishment unit 213, before the handover, may prepare for establishing synchronization (establish synchronization temporarily) with the base station of the handover destination.

The frame disassembling unit 214, from the baseband signal acquired from the demodulation unit 212, demultiplexes and extracts baseband signals of various channels included in the downlink radio frame, and outputs the baseband signal for every channel to the decoding unit 215.

The decoding unit 215 carries out error correction decoding of the baseband signals of various channels acquired from the frame disassembling unit 214, and outputs the decoded baseband signal to the multiplexing/demultiplexing unit 221.

The multiplexing/demultiplexing unit 221 demultiplexes data and control information which are included in the baseband signal acquired from the decoding unit 215. The demultiplexed downlink data are stored in the buffer 223. The demultiplexed downlink control information is output to the control information processing unit 222. In addition, the multiplexing/demultiplexing unit 221 multiplexes uplink data stored in the buffer 223 with uplink control information acquired from the control information processing unit 222, and outputs the multiplexed signal to the encoding unit 231.

The control information processing unit 222 acquires the downlink control information from the multiplexing/demultiplexing unit 221 and controls communication with the base stations 100 and 100a. In the downlink control information, the handover instruction is included. The control information processing unit 222, when acquiring the handover instruction, switches a connection destination of the relay station 200 from the base station 100 to the base station 100a. In addition, in the downlink control information, the broadcast information and calling information of PCH of the base stations 100 and 100a are included. In addition, the control information processing unit 222 stores control information used for control of communication with the mobile station 300 in the buffer 223. In addition, the control information processing unit 222 generates uplink control information, and outputs it to the multiplexing/demultiplexing unit 221. In the uplink control information, a handover request is included.

The encoding unit 231 carries out error correction encoding of baseband signals of various channels acquired from the multiplexing/demultiplexing unit 221, and outputs the encoded baseband signal to the frame generation unit 233.

The pilot generation unit 232 generates a known pilot signal, and outputs the generated pilot signal to the frame generation unit 233.

The frame generation unit 233 maps on the uplink radio frame the baseband signal acquired from the encoding unit 231 and the pilot signal acquired from the pilot generation unit 232, and outputs the baseband signal of the uplink radio frame to the modulation unit 234.

The modulation unit 234 carries out digital modulation of the baseband signal acquired from the frame generation unit 233, and outputs the modulated baseband signal to the radio transmission unit 235.

The radio transmission unit 235 up-converts the low frequency baseband signal acquired from the modulation unit 234 to a high frequency radio signal, and outputs the resultant signal to the antenna which the relay station 200 includes.

Figure 8:
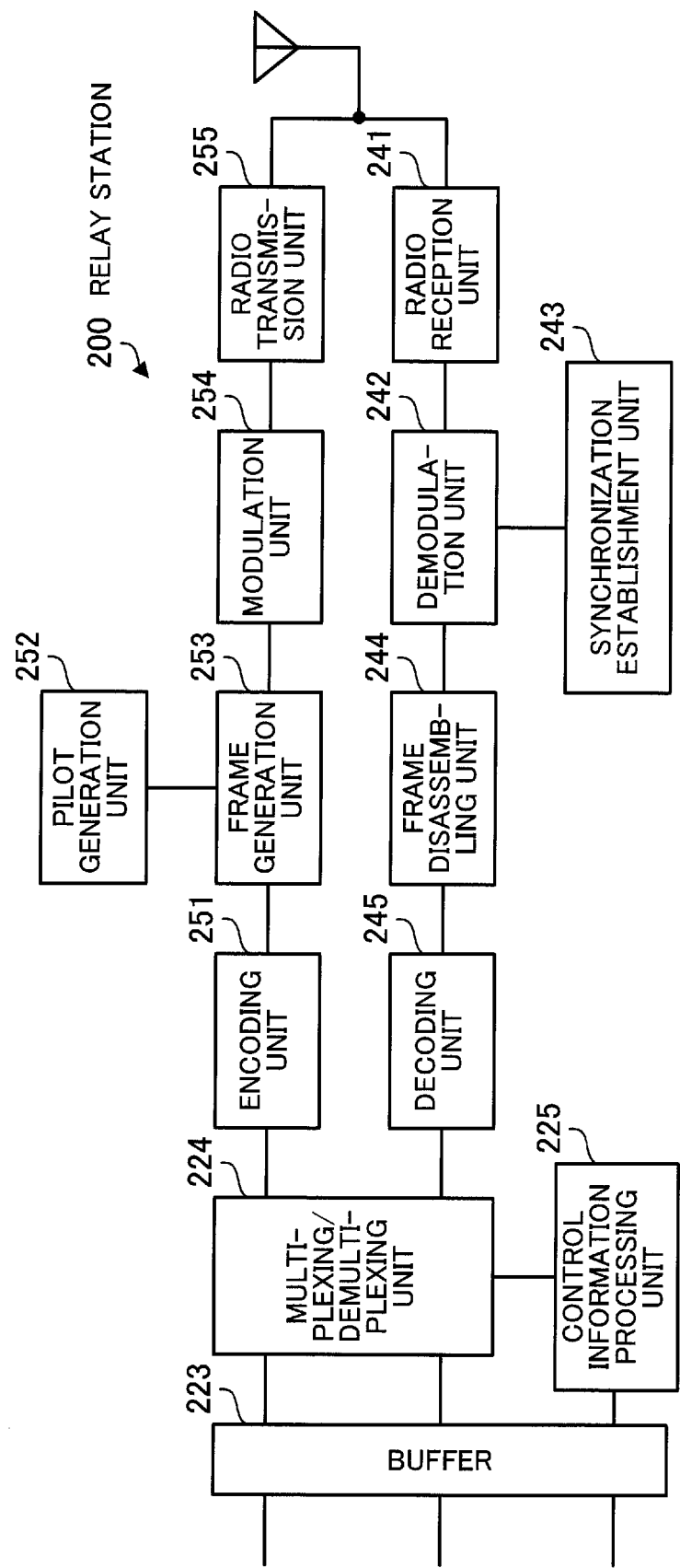
FIG. 8 is a block diagram (continued) illustrating the relay station.

FIG. 8 is a block diagram (continued) illustrating the relay station. FIG. 8 illustrates a block structure on the mobile station 300 side. The relay station 200 further includes a multiplexing/demultiplexing unit 224, a control information processing unit 225, a radio reception unit 241, a demodulation unit 242, a synchronization establishment unit 243, a frame disassembling unit 244, a decoding unit 245, an encoding unit 251, a pilot generation unit 252, a frame generation unit 253, a modulation unit 254, and a radio transmission unit 255. Besides, a set of the encoding unit 251, the frame generation unit 253, the modulation unit 254, and the radio transmission unit 255 may be regarded as an example of the transmitting unit 21 of the first embodiment. In addition, the control information processing unit 225 may be regarded as an example of the control unit 22.

The multiplexing/demultiplexing unit 224 demultiplexes data and control information which are included in the baseband signal acquired from the decoding unit 245. The demultiplexed uplink data are stored in the buffer 223. The demultiplexed uplink control information is output to the control information processing unit 225. In addition, the multiplexing/demultiplexing unit 224 multiplexes the downlink data stored in the buffer 223 with the downlink control information acquired from the control information processing unit 225, and output the multiplexed signal to the encoding unit 251.

The control information processing unit 225, while acquiring the uplink control information from the multiplexing/demultiplexing unit 224, acquires the downlink control information from the control information processing unit 222 through the buffer 223, and controls communication with the mobile station 300. In addition, the control information processing unit 225 generates downlink control information to be transmitted to the mobile station 300, and outputs it to the multiplexing/demultiplexing unit 224. In the control information to be transmitted to the mobile station 300, the broadcast information and calling information of PCH which are received from the base stations 100 and 100a are included.

For example, the control information processing unit 225, when the relay station 200 is connected with the base station 100, transfers by PBCH the broadcast information received from the base station 100. In addition, the control information processing unit 225, when the relay station 200 is connected with the base station 100a, transfers by PBCH the broadcast information received from the base station 100a. However, the control information processing unit 225, when the relay station 200 performs the handover from the base station 100 to the base station 100a, transmits the handover information by PBCH. In the handover information, included are at least a part of the broadcast information of the base station 100 and the broadcast information of the base station 100a, and timing difference information indicating a difference between communication timings before and after the handover. The difference between the communication timings is detected by the synchronization establishment unit 213.

The radio reception unit 241 down-converts a high frequency radio signal acquired from the antenna which the relay station 200 includes to a low frequency baseband signal, and outputs the resultant signal to the demodulation unit 242.

The demodulation unit 242 carries out digital demodulation of the baseband signal acquired from the radio reception unit 241, and outputs the demodulated signal to the frame disassembling unit 244. In addition, the demodulation unit 242 extracts a pilot signal from the demodulated baseband signal, and outputs it to the synchronization establishment unit 243.

The synchronization establishment unit 243, based on the pilot signal acquired from the demodulation unit 242, detects the timing at which the uplink radio frame and symbol are received from the mobile station 300, and establishes synchronization with the mobile station 300. Then, the synchronization establishment unit 243 controls the timing of reception processing of the relay station 200.

The frame disassembling unit 244, from the baseband signal acquired from the demodulation unit 242, demultiplexes and extracts baseband signals of various channels included in the uplink radio frame, and outputs the baseband signal for every channel to the decoding unit 245.

The decoding unit 245 carries out error correction decoding of the baseband signals of various channels acquired from the frame disassembling unit 244, and outputs the decoded baseband signal to the multiplexing/demultiplexing unit 224.

The encoding unit 251 carries out error correction encoding of the baseband signals of various channels acquired from the multiplexing/demultiplexing unit 224, and outputs the encoded baseband signal to the frame generation unit 253.

The pilot generation unit 252 generates a known pilot signal such as RS, and outputs the generated pilot signal to the frame generation unit 253.

The frame generation unit 253 maps the baseband signal acquired from the encoding unit 251 and the pilot signal acquired from the pilot generation unit 252 on the downlink radio frame, and outputs the baseband signal of the downlink radio frame to the modulation unit 254.

The modulation unit 254 carries out digital modulation of the baseband signal acquired from the frame generation unit 253, and outputs the modulated baseband signal to the radio transmission unit 255.

The radio transmission unit 255 up-converts the low frequency baseband signal acquired from the modulation unit 254 to a high frequency radio signal, and outputs the high frequency radio signal to the antenna which the relay station 200 includes.

Figure 9:
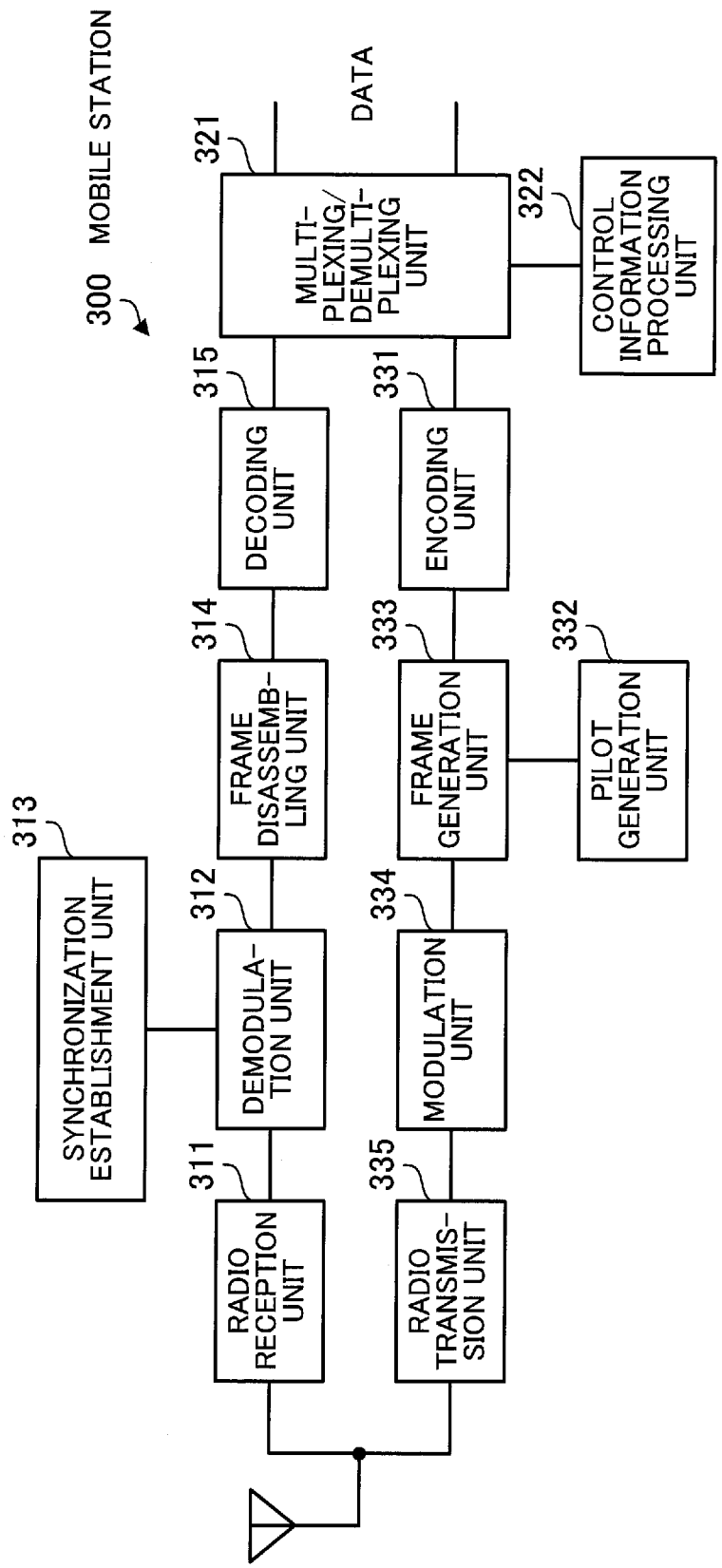
FIG. 9 is a block diagram illustrating a mobile station.

FIG. 9 is a block diagram illustrating a mobile station. The mobile station 300 includes a radio reception unit 311, a demodulation unit 312, a synchronization establishment unit 313, a frame disassembling unit 314, a decoding unit 315, a multiplexing/demultiplexing unit 321, a control information processing unit 322, an encoding unit 331, a pilot generation unit 332, a frame generation unit 333, a modulation unit 334, and a radio transmission unit 335. Besides, a set of the radio reception unit 311, the demodulation unit 312, the frame disassembling unit 314, and the decoding unit 315 may be regarded as an example of the receiving unit 31 of the first embodiment. In addition, the control information processing unit 322 may be regarded as an example of the control unit 32 of the first embodiment.

The radio reception unit 311 down-converts the high frequency radio signal acquired from an antenna which the mobile station 300 includes to a low frequency baseband signal, and outputs the resultant signal to the demodulation unit 312.

The demodulation unit 312 carries out digital demodulation of the baseband signal acquired from the radio reception unit 311, and outputs the demodulated signal to the frame disassembling unit 314. In addition, the demodulation unit 312 extracts a pilot signal from the demodulated baseband signal, and outputs it to the synchronization establishment unit 313.

The synchronization establishment unit 313, based on the pilot signal acquired from the demodulation unit 312, detects the timing at which the downlink radio frame and symbol are received from the relay station 200, and establishes synchronization with the relay station 200. Then, the synchronization establishment unit 313 controls the timing of reception processing of the mobile station 300. In addition, the synchronization establishment unit 313 performs cell searching. That is, the synchronization establishment unit 313 measures a reception power level of each cell based on the pilot signal, and detects a candidate of a relay station (or base station) of a connection destination. In addition, the synchronization establishment unit 313, before the relay station 200 performs a handover, acquires timing difference information from the control information processing unit 322. Then, the synchronization establishment unit 313, based on the timing difference information, performs preparation to establish synchronization with the relay station 200 after execution of the handover, and establishes synchronization promptly after the handover.

The frame disassembling unit 314, from the baseband signal acquired from the demodulation unit 312, demultiplexes and extracts baseband signals of various channels included in the downlink radio frame, and outputs the baseband signal for every channel to the decoding unit 315.

The decoding unit 315 carries out error correction decoding of the baseband signals of various channels acquired from the frame disassembling unit 314, and outputs the decoded baseband signal to the multiplexing/demultiplexing unit 321.

The multiplexing/demultiplexing unit 321 demultiplexes data and control information which are included in the baseband signal acquired from the decoding unit 315. The demultiplexed downlink data are given to a data processing unit (not illustrated) of a higher layer. The demultiplexed downlink control information is output to the control information processing unit 322. In addition, the multiplexing/demultiplexing unit 321 multiplexes uplink data with uplink control information acquired from the control information processing unit 322, and outputs the multiplexed signal to the encoding unit 331.

The control information processing unit 322 acquires the downlink control information from the multiplexing/demultiplexing unit 321, and controls communication with the relay station 200. In the downlink control information, broadcast information and calling information of PCH are included. The control information processing unit 322, from parameters included in the broadcast information received from the relay station 200 and the identification information given to the mobile station 300, calculates a period and sub-frame where the mobile station 300 is to receive PCH. Then, the control information processing unit 322, when the mobile station 300 is in a standby state, carries out control so as to receive PCH periodically.

In addition, the control information processing unit 322, when handover information is received from the relay station 200, notifies the synchronization establishment unit 313 of the timing difference information included in the handover information. In addition, the control information processing unit 322 calculates a period and sub-frame for receiving PCH after execution of the handover, and allows intermittent reception of PCH after the handover. In addition, the control information processing unit 322 generates uplink control information, and outputs it to the multiplexing/demultiplexing unit 321.

The encoding unit 331 carries out error correction encoding of the baseband signals of various channels acquired from the multiplexing/demultiplexing unit 321, and outputs the encoded baseband signal to the frame generation unit 333.

The pilot generation unit 332 generates a known pilot signal, and outputs the generated pilot signal to the frame generation unit 333.

The frame generation unit 333 maps the baseband signal acquired from the encoding unit 331 and the pilot signal acquired from the pilot generation unit 332 on the uplink radio frame, and outputs a baseband signal of the uplink radio frame to the modulation unit 334.

The modulation unit 334 carries out digital modulation of the baseband signal acquired from the frame generation unit 333, and outputs the modulated baseband signal to the radio transmission unit 335.

The radio transmission unit 335 up-converts the low frequency baseband signal acquired from the modulation unit 334 to a high frequency radio signal, and outputs the high frequency radio signal to the antenna which the mobile station 300 includes.

Figure 10:
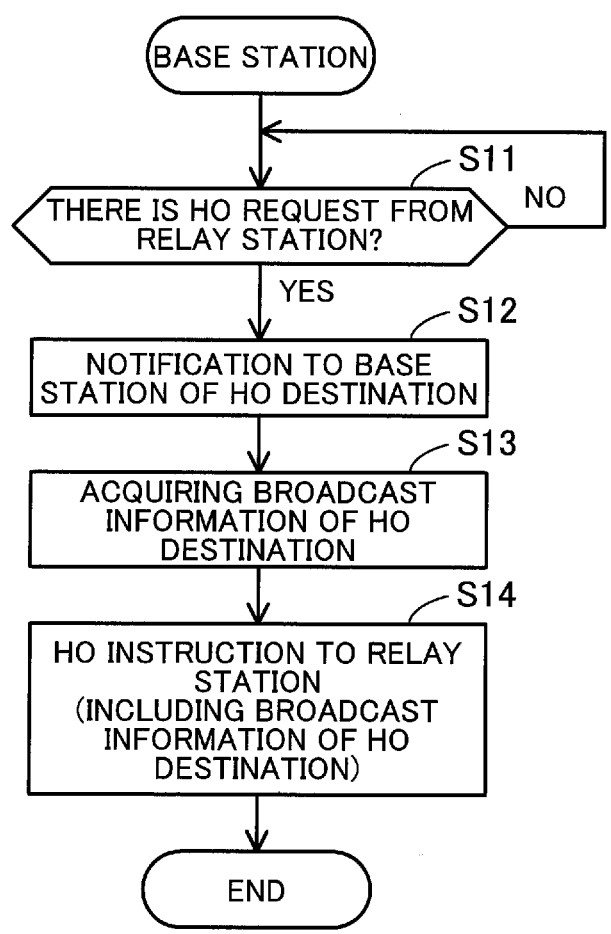
FIG. 10 is a flow chart illustrating handover control of the base station.

FIG. 10 is a flow chart illustrating handover control of the base station. Herein, processing executed in the base station 100 of a handover source is considered. Hereinafter, processing illustrated in FIG. 10 will be described along with step numbers.

(Step S11) The control information processing unit 122 determines whether a handover request is acquired from the relay station 200. When the handover request is acquired, the processing is forwarded to Step S12. When the handover request is not acquired, the processing of Step S11 is repeated.

(Step S12) The control information processing unit 122 notifies, through a wired network, the base station 100a of a handover destination of a handover notification indicating that the base station 100a is determined as the handover destination of the relay station 200.

(Step S13) The control information processing unit 122 acquires from base station 100a a handover response indicating that acceptance of the relay station 200 is possible. In the handover response acquired from the base station 100a, broadcast information of the base station 100a is included.

(Step S14) The control information processing unit 122, as control information of a layer 3, generates a handover instruction for instructing to execute the handover. In the handover instruction, the broadcast information of the base station 100a acquired at Step S13 is included. The radio transmission unit 135 transmits the handover instruction to the relay station 200.

Figure 11:
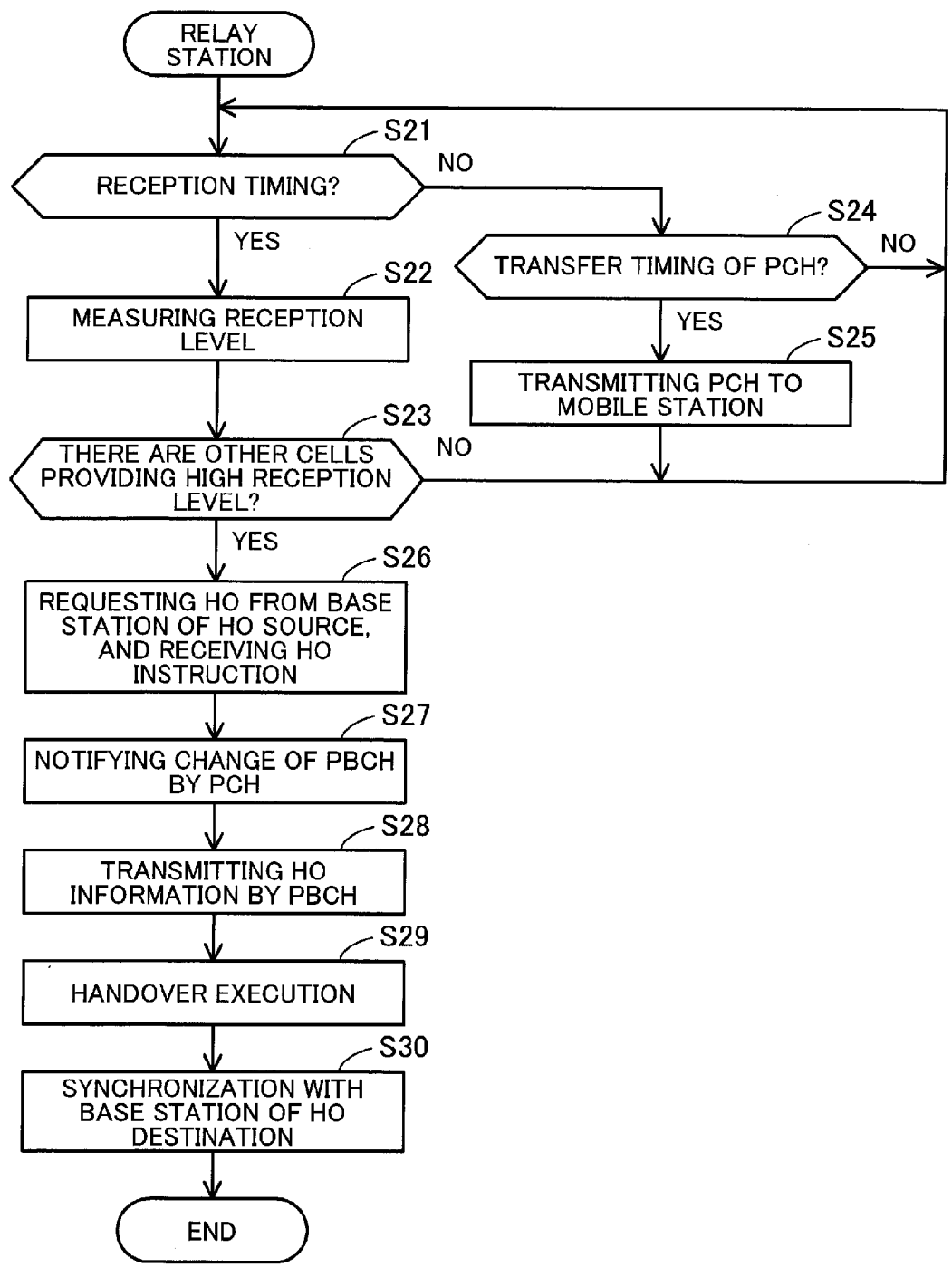
FIG. 11 is a flow chart illustrating handover control of the relay station.

FIG. 11 is a flow chart illustrating handover control of the relay station. Herein, a case where the mobile station 300 is in a standby state, and the relay station 200 carries out the handover from the base station 100 to the base station 100a will be considered. Hereinafter, processing illustrated in FIG. 11 will be described along with step numbers.

(Step S21) The control information processing unit 222 determines whether it is a timing for receiving the downlink sub-frame from the base station 100. When it is the timing for receiving, the processing is forwarded to Step S22. When it is the timing for not receiving, the processing is forwarded to Step S24.

(Step S22) The synchronization establishment unit 213, based on pilot signals received from the base stations 100 and 100a, measures a reception power level of neighboring cells.

(Step S23) The control information processing unit 222, from the measurement results of Step S22, determines whether other cells providing the higher reception power level than the cell of the base station 100 exist. When other cells providing the higher reception power level exist, the processing is forwarded to Step S26. When not existing, the processing is forwarded to Step S21.

(Step S24) The control information processing unit 225, determines whether it is a timing for transferring PCH transmitted by the base station 100. When it is the timing for transferring, the processing is forwarded to Step S25. When it is not the timing for transferring, the processing is forwarded to Step S21.

(Step S25) The control information processing unit 225 outputs the calling information received from the base station 100. The radio transmission unit 255 transmits PCH to the mobile station 300. Then, the processing is forwarded to Step S21.

(Step S26) The control information processing unit 222 generates a handover request. The radio transmission unit 235 transmits the handover request to the base station 100. The radio reception unit 211 receives the handover instruction from the base station 100. The control information processing unit 222 extracts broadcast information of the base station 100a included in the handover instruction.

(Step S27) The control information processing unit 225, when detecting execution of the handover, generates a change notice indicating that broadcast information of PBCH is changed. The radio transmission unit 255 transmits the change notice by PCH.

(Step S28) The synchronization establishment unit 213 calculates a reception timing difference of the frame and symbol between the base station 100 and the base station 100a. The reception timing of the base station 100a is already detected, at Step S22, through the processing for receiving a pilot signal. The control information processing unit 225 generates handover information. In the handover information, included are at least a part of the broadcast information of the base station 100 and the broadcast information of the base station 100a acquired at Step S26, and timing difference information indicating the reception timing difference. The radio transmission unit 255 transmits the handover information by PBCH.

(Step S29) The control information processing unit 222 executes the handover for switching the connection destination from the base station 100 to the base station 100a.

(Step S30) The synchronization establishment unit 213, based on the reception timing detected at Step S22, establishes synchronization with the base station 100a.

Figure 12:
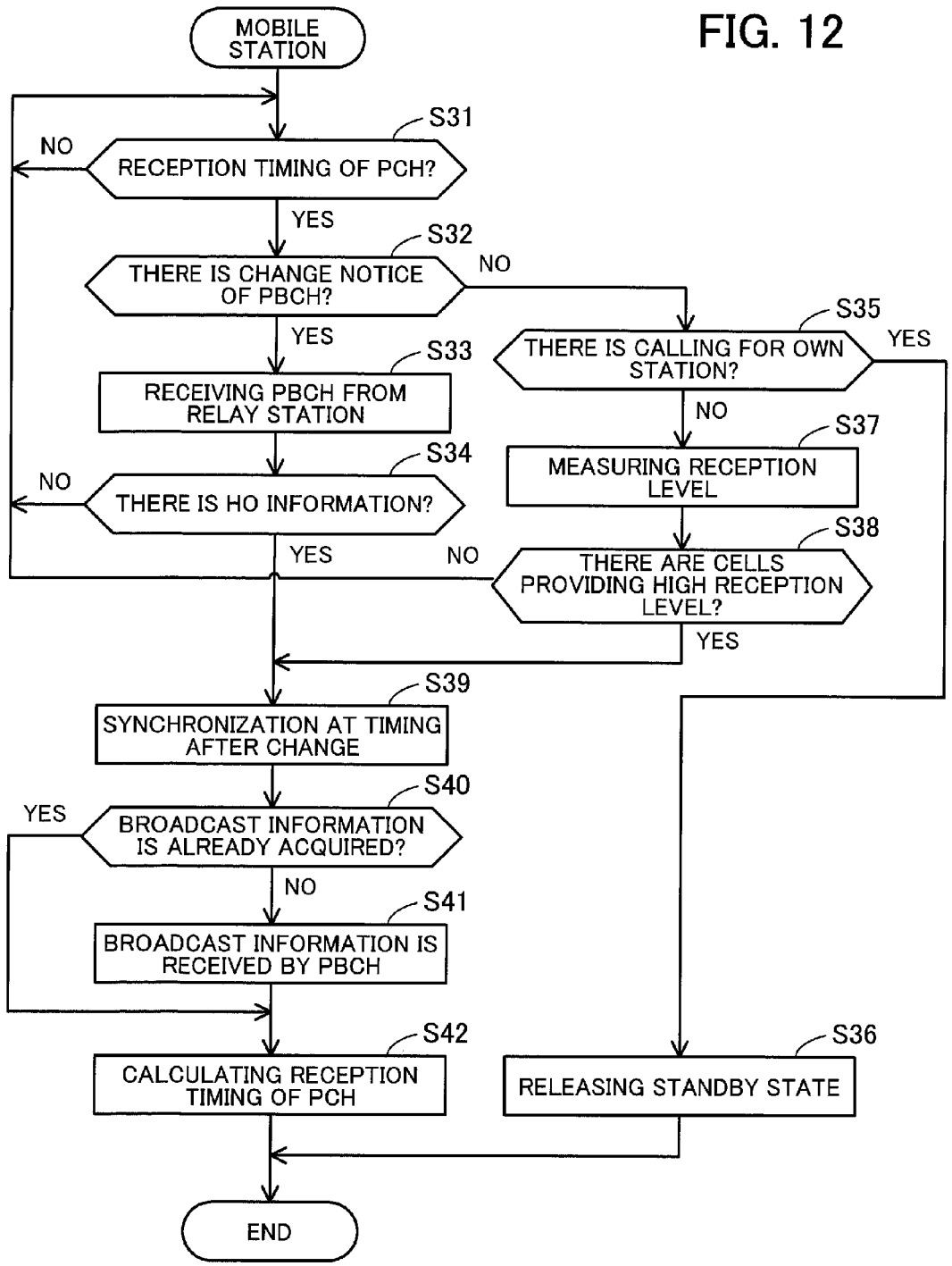
FIG. 12 is a flow chart illustrating handover control of the mobile station.

FIG. 12 is a flow chart illustrating handover control of the mobile station. Herein, a case where the mobile station 300 is in a standby state will be considered. Hereinafter, processing illustrated in FIG. 12 will be described along with step numbers.

(Step S31) The control information processing unit 322 determines whether it is a timing for receiving PCH from the relay station 200. When it is the timing for receiving, the processing is forwarded to Step S32. When it is not the timing for receiving, the processing of Step S31 is repeated.

(Step S32) The control information processing unit 322 determines whether the change notice is received by PCH. When the change notice is received, the processing is forwarded to Step S33. When the change notice is not received, the processing is forwarded to Step S35.

(Step S33) The radio reception unit 311 receives PBCH from the relay station 200.

(Step S34) The control information processing unit 322 determines whether the handover information is received by PBCH. When the handover information is received, the processing is forwarded to Step S39. When it is not received, the processing is forwarded to Step S31.

(Step S35) The control information processing unit 322 determines whether calling information indicating a calling of its own station is received by PCH. When it is received, the processing is forwarded to Step S36. When it is not received, the processing is forwarded to Step S37.

(Step S36) The control information processing unit 322 releases the standby state, and moves to a state where data communication is possible. Then, the processing is finished.

(Step S37) The synchronization establishment unit 313, based on the received pilot signal, measures reception power levels of neighboring cells.

(Step S38) The control information processing unit 322, from the measurement results of Step S37, determines whether other cells providing the higher reception power level than the cell of the relay station 200 exist. When other cells providing the higher reception power level exist, the processing is forwarded to Step S39. When not existing, the processing is forwarded to Step S31.

(Step S39) The synchronization establishment unit 313, when the reception timing of the frame and symbol is changed, establishes synchronization again. At that time, the synchronization establishment unit 313, when the reception timing is changed due to the handover of the relay station 200, based on the reception timing before the handover and timing difference information included in the handover information, calculates a reception timing after the handover. On the other hand, the synchronization establishment unit 313, when the reception timing is changed due to the handover of the mobile station 300, based on the reception timing detected at Step S37, establishes synchronization.

(Step S40) The control information processing unit 322 determines whether the broadcast information on the handover destination is already acquired. When it is already acquired, the processing is forwarded to Step S42. When it is not yet acquired, the processing is forwarded to Step S41.

(Step S41) The radio reception unit 311 receives PBCH from a new connection destination. The control information processing unit 322 extracts broadcast information of PBCH.

(Step S42) The control information processing unit 322, from parameters included in the already acquired broadcast information and the identification information of the mobile station 300, calculates a period and sub-frame for receiving PCH. The control information processing unit 322, when the reception timing is changed due to the handover of the relay station 200, calculates the period and sub-frame for receiving PCH using the broadcast information of the base station 100a included in the handover information. Then, the control information processing unit 322 sets a reception timing of PCH.

FIG. 13 illustrates an example of handover information. As mentioned above, in the handover information which the relay station 200 transmits by PBCH, included are at least a part of the broadcast information of the base station 100 and the broadcast information of the base station 100a, and the timing difference information. Herein, the relay station 200 may transmit all of the broadcast information of the base station 100a ((A) of FIG. 13). In addition, the relay station 200, from among the broadcast information of the base station 100a, may extract and transmit a different portion (a difference) from the broadcast information of the base station 100 ((B) of FIG. 13). The relay station 200 may suppress a data amount of the handover information by extracting the difference.

Figure 14:
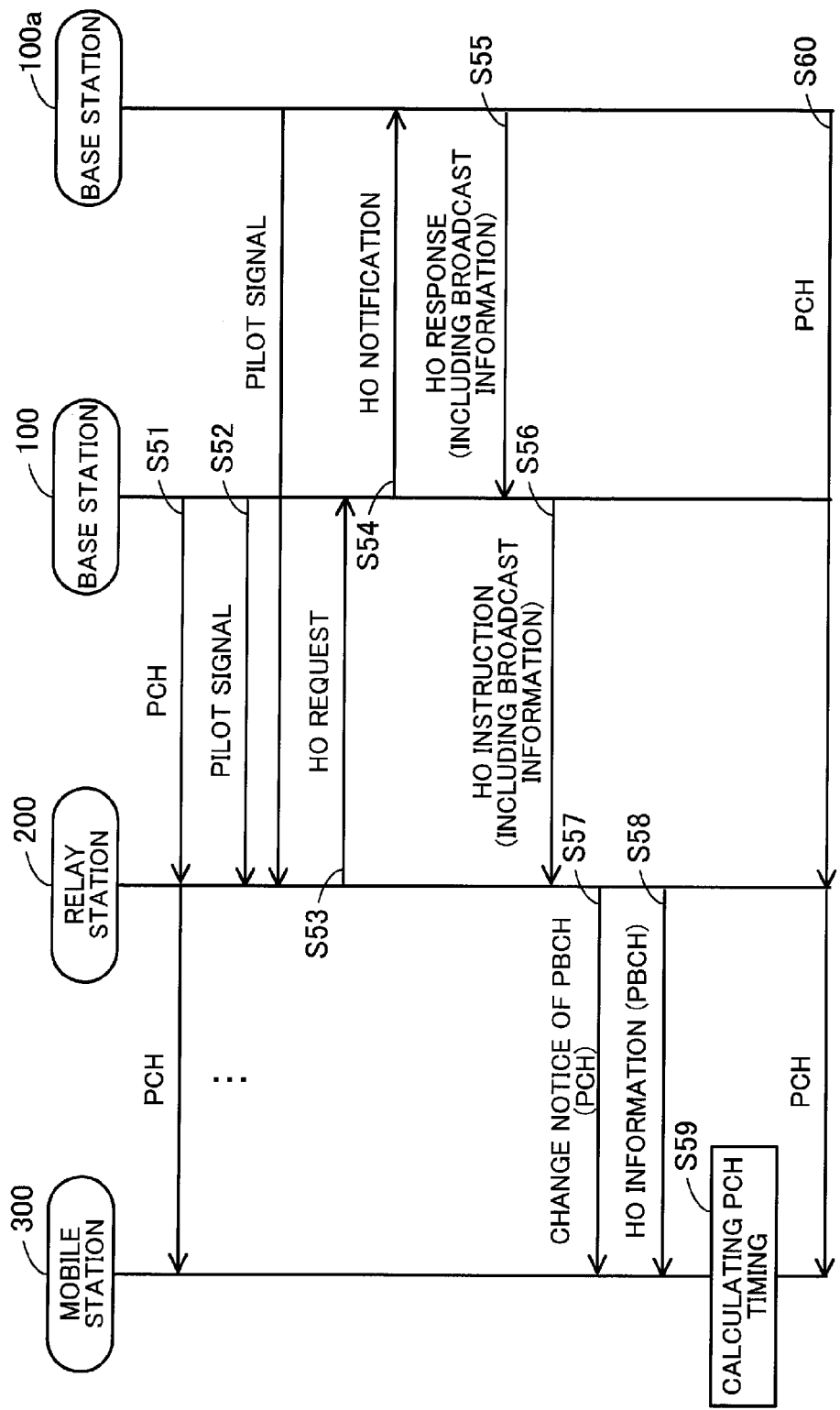
FIG. 14 is a first sequence diagram illustrating a flow of the handover control.

FIG. 14 is a first sequence diagram illustrating a flow of handover control. Processing of FIG. 14 will be described along with step numbers.

(Step S51) The base station 100 transmits PCH. The relay station 200 transfers PCH transmitted by the base station 100. The mobile station 300, while receiving the broadcast information of the base station 100 from the relay station 200, calculates a reception timing of PCH, and receives PCH periodically.

(Step S52) The base stations 100 and 100a each transmit a pilot signal. The relay station 200, based on the pilot signal measures a reception power level.

(Step S53) The relay station 200 detects that a reception power level of the cell of the base station 100a is larger than that of the cell of the base station 100, and transmits a handover request to the base station 100.

(Step S54) The base station 100 transmits handover notification to the base station 100a.

(Step S55) The base station 100a confirms that the relay station 200 is acceptable, and transmits a handover response including broadcast information of the base station 100a to the base station 100.

(Step S56) The base station 100 transmits to the relay station 200 a handover instruction including the broadcast information of the base station 100a which is acquired at Step S55.

(Step S57) The relay station 200, after reception of the handover instruction until execution of a handover, inserts in PCH and transmits a change notice indicating the change of PBCH.

(Step S58) The relay station 200, after reception of the handover instruction until execution of a handover, transmits by PBCH handover information including at least a part of the broadcast information of the base station 100a and the timing difference information. The mobile station 300, when receiving PCH and detecting the change notice, receives PBCH to extract the handover information.

(Step S59) The mobile station 300, based on the received handover information, calculates a reception timing of PCH after the relay station 200 executes the handover.

(Step S60) The relay station 200 executes the handover for switching a connection destination from the base station 100 to the base station 100a. The base station 100a transmits PCH. The relay station 200 transfers PCH transmitted by the base station 100a. The mobile station 300 receives PCH at the timing calculated at Step S59.

Besides, the relay station 200 may or may not notify the mobile station 300 of execution of the handover. In the former, the mobile station 300 receives the notification from the relay station 200 to switch the reception timing of PCH.

In the latter, the mobile station 300, for example, when trying and failing in reception of PCH at the timing before the handover, determines that the handover has been executed, and switches the reception timing of PCH.

In the above description, it is assumed that the relay station 200 receives from the base station 100 the broadcast information of the base station 100a which is the handover destination. However, the relay station 200 may also directly receive from the base station 100a the broadcast information of the base station 100a.

Figure 15:
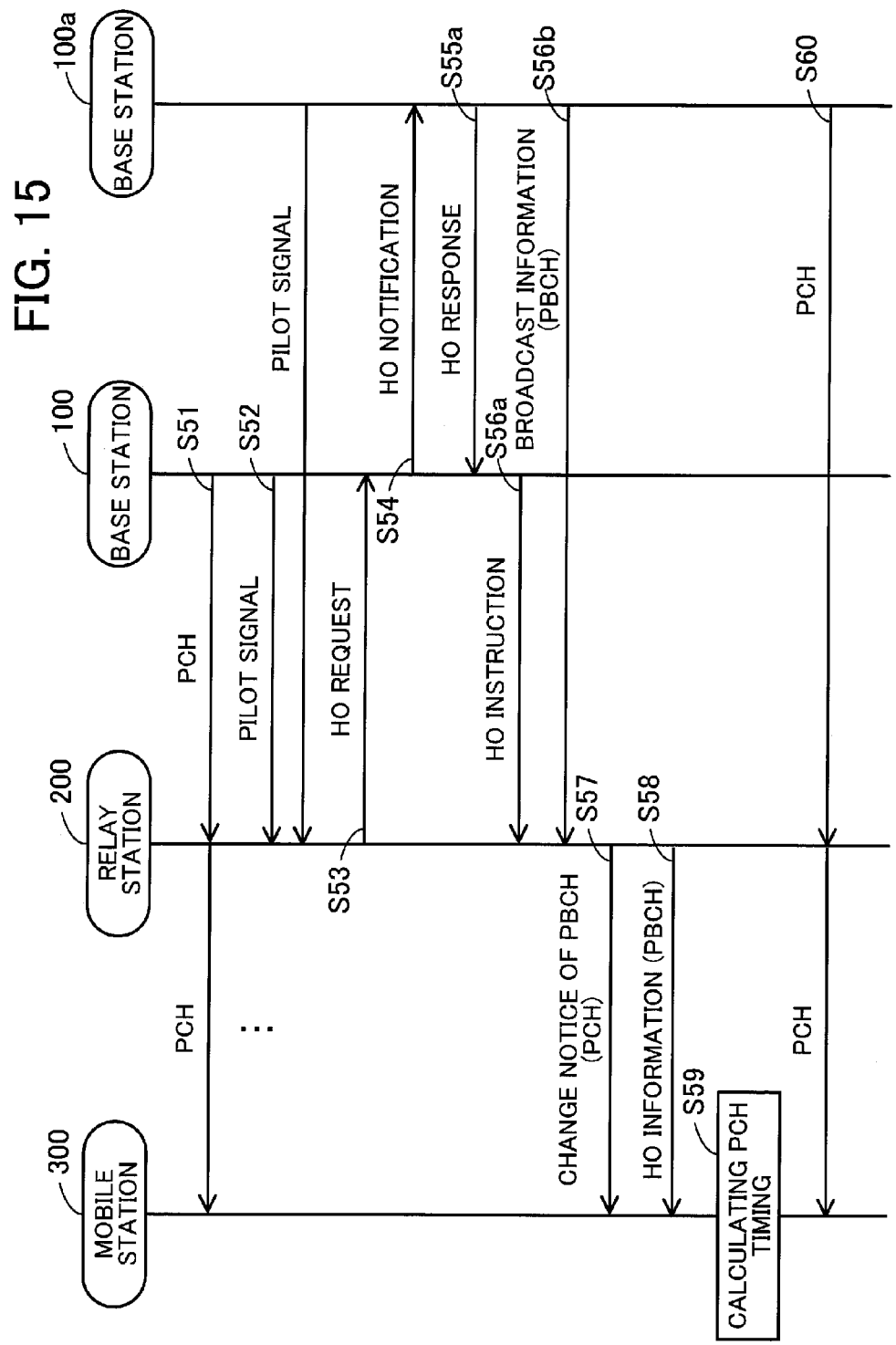
FIG. 15 is a second sequence diagram illustrating a flow of the handover control.

FIG. 15 is a second sequence diagram illustrating a flow of handover control. The sequence diagram of FIG. 15 illustrates a case where the relay station 200 directly receives the broadcast information of the base station 100a. In this second sequence example, between Step S54 and Step S57 which are the first sequence examples illustrated in FIG. 14, following Steps S55a, S56a, and S56b are executed.

(Step S55a) The base station 100a confirms that the relay station 200 is acceptable, and transmits a handover response to the base station 100.

(Step S56a) The base station 100 transmits a handover instruction to the relay station 200.

(Step S56b) The base station 100a transmits broadcast information by PBCH. The relay station 200 receives the broadcast information from the base station 100a. The relay station 200, using the broadcast information received from the base station 100a, generates handover information to be transmitted at Step S58.

Figure 16:
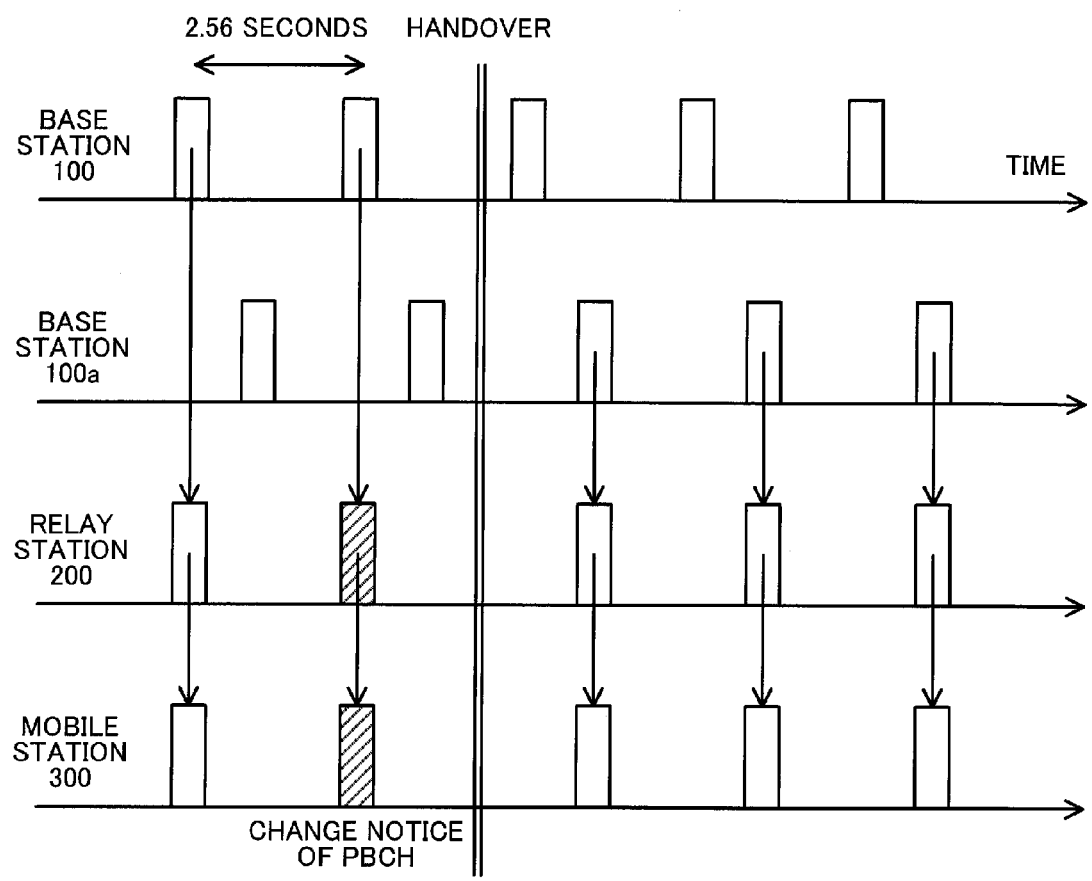
FIG. 16 illustrates an example of a reception timing of a paging channel.

FIG. 16 illustrates an example of a reception timing of a paging channel. The base stations 100 and 100a each transmit PCH continuously at a different timing. The relay station 200, when being connected to the base station 100, receives PCH from the base station 100, and transfers it by the downlink sub-frame. In addition, the relay station 200, when being connected to the base station 100a, receives PCH from the base station 100a, and transfers it by the downlink sub-frame. The mobile station 300 receives, in a standby state, PCH from the relay station 200 periodically (for example, every 2.56 seconds).

Herein, the relay station 200, before execution of the handover for switching the connection destination from the base station 100 to the base station 100a, inserts in PCH and transmits the change notice of PBCH. The mobile station 300, when receiving PCH and detecting the change notice, receives PBCH from the relay station 200. Then, the mobile station 300, based on the handover information transmitted by PBCH, calculates a reception timing of PCH after the handover. The mobile station 300, when a transfer timing of PCH of the relay station 200 is changed, receives PCH at the reception timing calculated before the handover. Thereby, the mobile station 300 may maintain a standby state where PCH is received intermittently.

The mobile communication system of the second embodiment like this, even when the relay station 200 performs a handover, allows suppression of an influence on the mobile station 300 which receives PCH intermittently. That is, the mobile station 300, since being able to acquire from the relay station 200 the broadcast information of the base station 100a before a handover, even when the timing at which the relay station 200 transfers PCH is changed due to the handover, the reception timing after the transfer timing is changed is able to be calculated easily. Therefore, the mobile station 300 is able to move promptly to the standby state where PCH transmitted by the base station 100a is received intermittently, and an electric power consumption of the mobile station 300 is able to be suppressed.

According to the above-mentioned radio communication method, a relay station and a mobile station, an influence on mobile station communication due to a handover by a relay station is able to be suppressed. The above-mentioned and other objects, characteristics, and advantages of the invention will be made clear in accordance with the following descriptions associated with accompanying drawings representing embodiments which are preferable as an example of the invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio communication method of a mobile communication system where a mobile station receives intermittently a channel transmitted by a first or second base station through a relay station, the radio communication method comprising:

transmitting, by the relay station, information on the second base station over a broadcast channel, before execution of a handover for switching a connection destination of the relay station from the first base station to the second base station;

inserting, by the relay station, notification information indicating that information transmitted over the broadcast channel has changed in the channel before the handover;

receiving, by the mobile station, the broadcast channel upon detecting that the notification information is included in the channel, and extracting the information on the second base station; and controlling, by the mobile station, based on the information on the second base station received from the relay station before the handover, a timing for receiving the channel from the relay station after the handover, wherein the channel is a channel different from the broadcast channel.

2. The radio communication method according to claim 1, further comprising:

transmitting, by the relay station, time difference information indicating a frame timing difference between the first base station and the second base station before the handover, and taking, by the mobile station, based on the time difference information received from the relay station before the handover, synchronization with the relay station after the execution of the handover.

3. The radio communication method according to claim 1, further comprising multiplexing, by the relay station, broadcast information of the first base station with the information on the second base station before the handover, and transmitting the multiplexed information over the broadcast channel.

4. The radio communication method according to claim 1, further comprising receiving, by the relay station, the information on the second base station from the second base station or acquiring the information on the second base station through the first base station.

5. The radio communication method according to claim 1, wherein
the channel is a paging channel used for calling the mobile station.

6. A relay station that relays communication between a first and a second base station and a mobile station, comprising:
a transmitter configured to transfer a channel transmitted by the first base station at a timing appropriate to the first base station, and to transfer the channel transmitted by the second base station at a timing appropriate to the second base station after execution of a handover for switching a connection destination of the relay station from the first base station to the second base station; and
a controller configured to notify, before the handover, the mobile station receiving the channel intermittently of information on the second base station over a broadcast channel, and insert notification information indicating that information transmitted over the broadcast channel has changed in the channel before the handover,
wherein the channel is a channel different from the broadcast channel.

7. A mobile station, comprising:
a receiver configured to receive intermittently a channel transmitted by a first or second base station through a relay station connected to the first or second base station; and
a controller configured to detect that notification information indicating that information transmitted over a broadcast channel has changed is included in the channel, to acquire information on the second base station transmitted over the broadcast channel from the relay station before execution of a handover for switching a connection destination of the relay station from the first base station to the second base station, and to control a timing for receiving the channel from the relay station after the handover based on the information on the second base station,
wherein the channel is a channel different from the broadcast channel.

* * * * *